(No Model.)
L. O. MUELLER & L. STADER.
COFFIN.
No. 466,358. Patented Jan. 5, 1892.
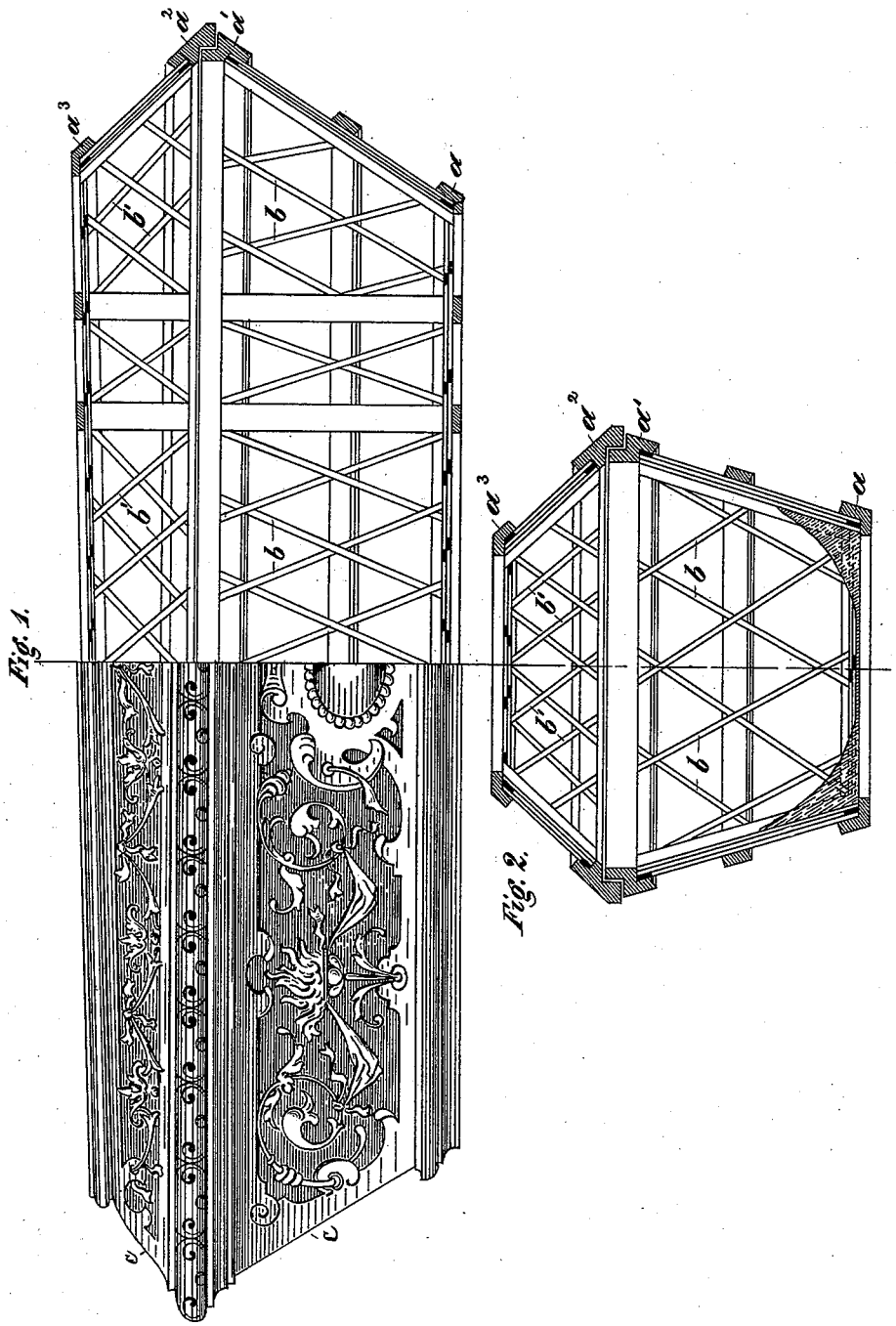

UNITED STATES PATENT OFFICE.

LUDWIG OTTO MUELLER AND LAMBERT STADER, OF MUNICH, GERMANY, ASSIGNORS TO OTTO VOLKER, OF SAME PLACE.

COFFIN.

SPECIFICATION forming part of Letters Patent No. 466,358, dated January 5, 1892.

Application filed May 5, 1891. Serial No. 391,667. (No model.)

*To all whom it may concern:*

Be it known that we, LUDWIG OTTO MUELLER and LAMBERT STADER, both residents of Munich, Bavaria, Germany, have invented certain new and useful Improvements in Coffins, of which the following is a specification.

This invention relates to an improved coffin composed of a skeleton frame covered by a composition which remains intact above ground, but disintegrates underground, and thus causes the corpse to rapidly decompose.

The invention consists in the various features of improvement more fully pointed out in the claim.

In the accompanying drawings, Figure 1 is an elevation, partly in section, of our improved coffin. Fig. 2 is a cross-section thereof.

The letters $a\ a'\ a^2\ a^3$ represent a series of horizontal frames constituting, respectively, the bottom and top of the coffin proper and the bottom and top of the coffin-lid. The frames $a\ a'$ are connected by the rods $b$, the whole constituting a skeleton coffin-body. Similar rods $b'$ connect the frames $a^2\ a^3$ to form a skeleton lid. The skeleton frame is now saturated with a solution of copper ammonium oxide, which prevents the coating from falling off. This coating $c$ consists of a mixture of plaster-of-paris, dextrine, and a silicate, to which are added carbonate of lime, carbonate of soda, or another carbonate and sulphur. In lieu of the dextrine, any other adhesive material may be employed which has the property to render the plaster-of-paris more compact by closing up the pores and to thus bind the same as long as the coffin is above ground. The carbonate of lime also constitutes a means for binding the mass and rendering it pliable. The sulphur and the carbonate cause the compound to gradually disintegrate underground.

The compound is very hard when exposed to air and is impervious to the same; but when underground the moisture will cause the mass to become porous. The adhesive material is dissolved out of the same, while the silicates and plaster-of-paris are converted into salts soluble in water. The sulphur and carbonate of lime cause a gradual disintegration of the compound. Any suitable pigment may be added to the mass, if desired.

What we claim is—

A coffin composed of a skeleton frame, and a compound consisting of plaster-of-paris, carbonate of lime, dextrine, silicates, a further carbonate, and sulphur, substantially as specified.

In testimony that we claim the foregoing as our invention we have signed our names in presence of two subscribing witnesses.

L. OTTO MUELLER.
LAMBERT STADER.

Witnesses:
ALBERT W. EICKMAN,
H. NICKEL.